(12) United States Patent
Moyal et al.

(10) Patent No.: US 11,140,050 B2
(45) Date of Patent: Oct. 5, 2021

(54) LOCALIZATION OF PRIVATE SERVICE INSTANCES

(71) Applicant: International Business Machines Corporation, Armonk, NY (US)

(72) Inventors: Shailendra Moyal, Pune (IN); Akash U. Dhoot, Maharashtra (IN); Nitin S. Jadhav, Pune (IN); Niteen D. Lakhe, Pune (IN)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 16/142,022

(22) Filed: Sep. 26, 2018

(65) Prior Publication Data

US 2020/0099595 A1    Mar. 26, 2020

(51) Int. Cl.
| G06F 15/16 | (2006.01) |
| H04L 12/24 | (2006.01) |
| H04L 29/06 | (2006.01) |
| H04L 29/08 | (2006.01) |

(52) U.S. Cl.
CPC ...... H04L 41/5045 (2013.01); H04L 63/0428 (2013.01); H04L 67/10 (2013.01); H04L 67/16 (2013.01); H04L 67/22 (2013.01)

(58) Field of Classification Search
CPC . H04L 41/5045; H04L 67/22; H04L 63/0428; H04L 65/4084; H04L 41/5054
See application file for complete search history.

(56) References Cited

U.S. PATENT DOCUMENTS

| 8,813,192 B2 | 8/2014 | Bergeson et al. | |
| 9,237,188 B1* | 1/2016 | Gabrielson | H04L 67/10 |
| 2011/0320882 A1* | 12/2011 | Beaty | G06F 11/1438 |
| | | | 714/45 |
| 2012/0005724 A1* | 1/2012 | Lee | H04L 63/0209 |
| | | | 726/1 |
| 2012/0110055 A1* | 5/2012 | Van Biljon | G06Q 30/04 |
| | | | 709/201 |
| 2012/0233668 A1* | 9/2012 | Leafe | G06F 9/45558 |
| | | | 726/4 |
| 2012/0284780 A1* | 11/2012 | Bergeson | H04L 63/0823 |
| | | | 726/6 |

(Continued)

FOREIGN PATENT DOCUMENTS

WO     2014150878 A1    9/2014

OTHER PUBLICATIONS

McGilvary et al. "Ad hoc Cloud Computing: From Concept to Realization" AR Xiv:1505.08097v2 [cs.DC] Jul. 19, 2015. Six pages.

(Continued)

*Primary Examiner* — Umar Cheema
*Assistant Examiner* — Tesfu N Mekonen
(74) *Attorney, Agent, or Firm* — Stephen R. Yoder

(57) ABSTRACT

Ad hoc private localization of service instances of a global service provided via hybrid cloud computing environment. In-memory and/or container image-based provisioning of a service instance from a public cloud portion to a private cloud portion within a hybrid cloud computing environment is based on context of service usage, pattern of service usage, predicted environmental conditions, and/or subscription-based input.

17 Claims, 10 Drawing Sheets

(56) References Cited

U.S. PATENT DOCUMENTS

| | | | |
|---|---|---|---|
| 2013/0142201 A1 | 6/2013 | Kim et al. | |
| 2013/0304903 A1* | 11/2013 | Mick | H04L 67/10 709/224 |
| 2014/0089658 A1* | 3/2014 | Raghuram | H04L 9/0825 713/155 |
| 2014/0208316 A1* | 7/2014 | Ciano | G06F 9/4856 718/1 |
| 2016/0072910 A1* | 3/2016 | Eicher | H04L 67/325 709/213 |
| 2016/0162308 A1* | 6/2016 | Chen | G06F 9/45558 718/1 |
| 2016/0173487 A1* | 6/2016 | Griffith | H04L 63/0823 713/156 |
| 2016/0241446 A1* | 8/2016 | Gupte | H04L 41/20 |
| 2017/0006119 A1* | 1/2017 | Pogrebinsky | H04L 67/20 |
| 2017/0109190 A1* | 4/2017 | Sha | G06F 9/45558 |
| 2017/0214632 A1* | 7/2017 | Ravi | H04L 41/0896 |
| 2017/0353531 A1* | 12/2017 | Conn | H04L 67/2861 |
| 2019/0166125 A1* | 5/2019 | Bender | H04L 63/02 |
| 2019/0354389 A1* | 11/2019 | Du | G06F 9/45508 |
| 2019/0392045 A1* | 12/2019 | De Lima Junior | G06F 16/128 |

OTHER PUBLICATIONS

Mell et al. "The NIST Definition of Cloud Computing Recommendations of the National Institute of Standards and Technology" NIST Special Publication 800-145. Gaithersburg, MD. Sep. 2011.

* cited by examiner

LOCALIZATION OF PRIVATE SERVICE INSTANCES

BACKGROUND

The present invention relates generally to the field of hybrid cloud computing, and more particularly to operation of service instances.

Service oriented architecture computing services (herein sometimes referred to more simply as "services") are known. In the contexts of software architecture, service-orientation in computing and service-oriented software architecture, a service is a computing functionality (for example, a software functionality) or a set of computing functionalities. In common computing parlance, "service" also refers to the machine logic (for example, computer program code that provides the functionality(ies)—however, this document may sometimes refer to the machine logic that implements the functionality of a service as service code. For example, one example service is retrieval of specified information. Another example service is the execution of a set of operations. Typically, different clients reuse a given service in the context of many and various larger computing tasks. For example, a service that retrieves a record associated with a person's name from a large data base may be used in: (i) by a larger program that is used to authenticate the person's identity over a communication network; (ii) by a larger program used to implement a legal change to the person's name; and (iii) by a search engine. In this example, the same code to retrieve the individual's record does not have to be rewritten for all three programs.

Cloud based software usage often refers to either public cloud usage or private cloud usage. As discussed in detail below, hybrid cloud usage includes a portion allocated to private cloud usage and a portion allocated to private cloud usage. Due to varied advantages like cost effectiveness, delegation of responsibility, on-demand upward or downward scaling, and on-demand service provisioning, cloud-based software usage by organizations is predominately via private cloud infrastructure. Concerns about the public cloud infrastructure has caused organizations to hold back from moving to the public cloud. When organizations chose to take advantage of public cloud usage, they often prefer a hybrid cloud infrastructure.

The memory controller is a digital circuit that manages the flow of data going to and from the computer's main memory. A memory controller can be a separate chip or integrated into another chip, such as being placed on the same die or as an integral part of a microprocessor; in the latter case, it is usually called an integrated memory controller (IMC). A memory controller is sometimes also called a memory chip controller (MCC) or a memory controller unit (MCU).

SUMMARY

According to an aspect of the present invention, there is a method, computer program product and/or system for ad hoc private service localization from a public cloud component in a hybrid cloud environment that performs the following operations (not necessarily in the following order): (i) identifying a set of service instances of a global service within the hybrid cloud environment, the set of service instances each being used for exchange of confidential data over a private cloud portion of the hybrid cloud environment; (ii) determining the global service will be used by a first user to exchange confidential data; (iii) determining to generate a first service instance of the global service as a first ad hoc service instance for the first user; (iv) composing a private service instance image of the first service instance; and (v) establishing the ad hoc private service instance by localizing the private service instance image.

DETAILED DESCRIPTION

Figure 1:
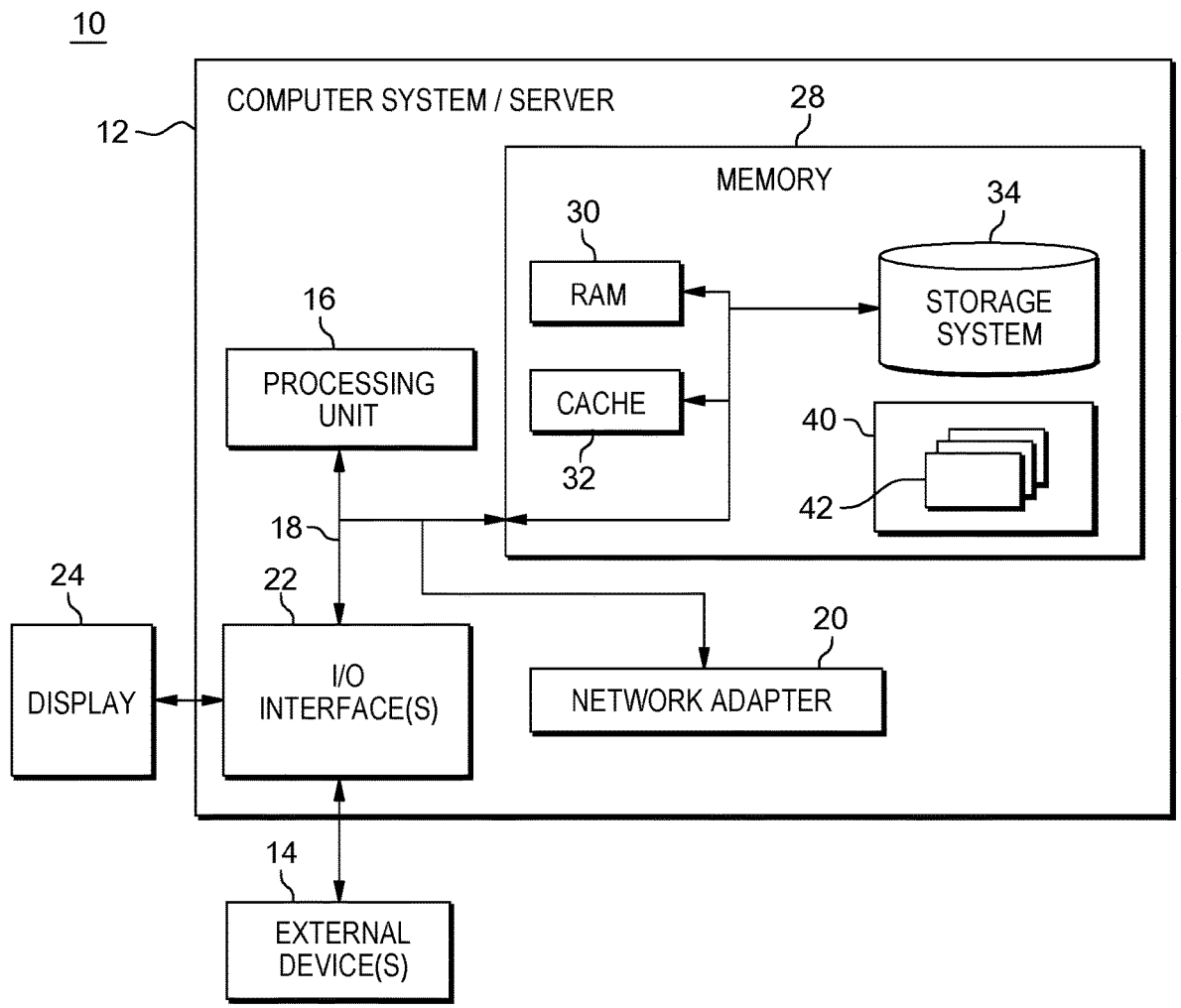
FIG. 1 depicts a cloud computing node used in a first embodiment of a system according to the present invention.

Ad hoc private localization of service instances of a global service provided from a public cloud portion of a hybrid cloud computing environment. In-memory and/or container image-based provisioning of a service instance from a public cloud portion to an ad hoc private cloud portion within a hybrid cloud computing environment is based on context of service usage, pattern of service usage, predicted environmental conditions, and/or subscription-based input.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
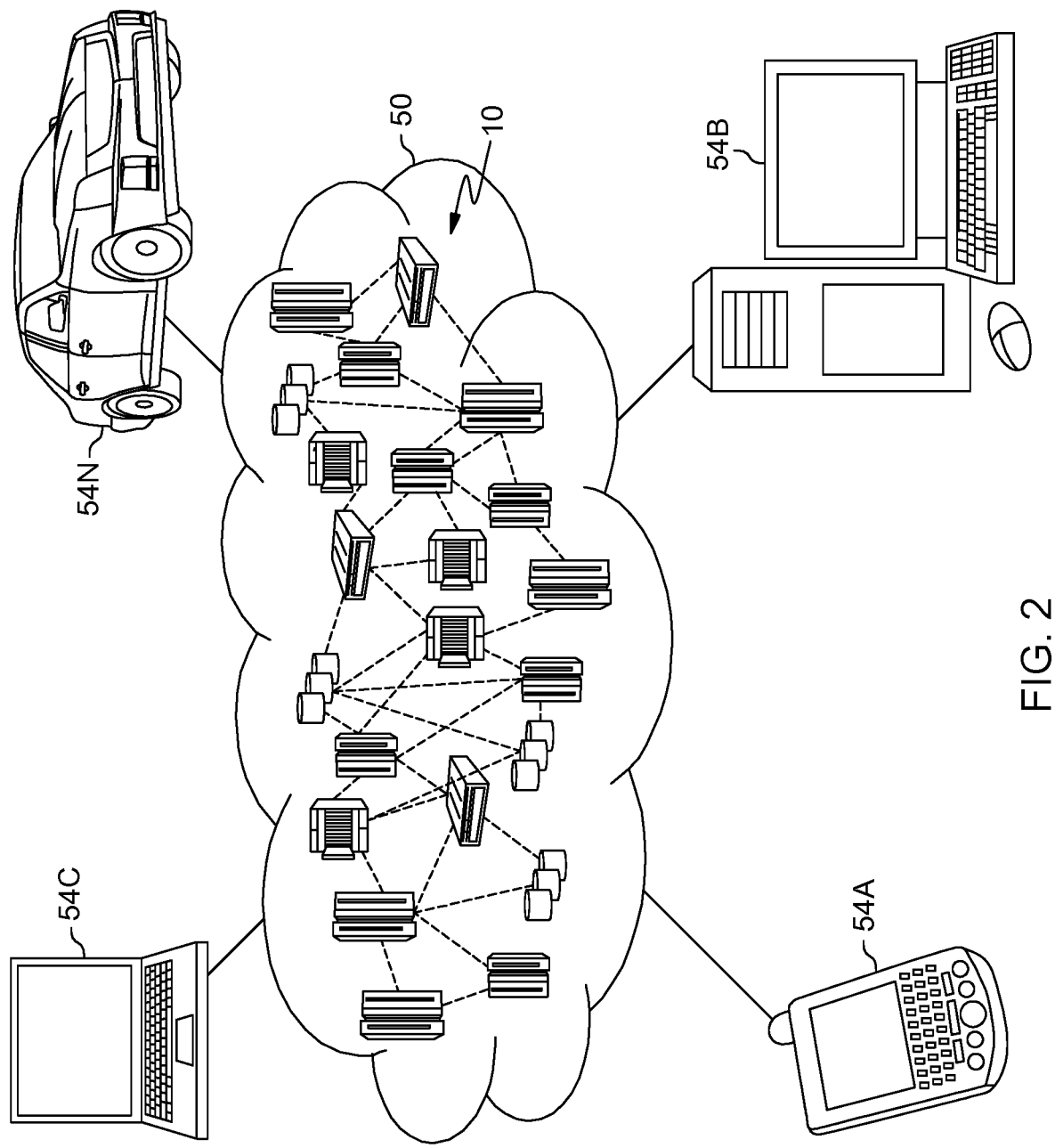
FIG. 2 depicts a first embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
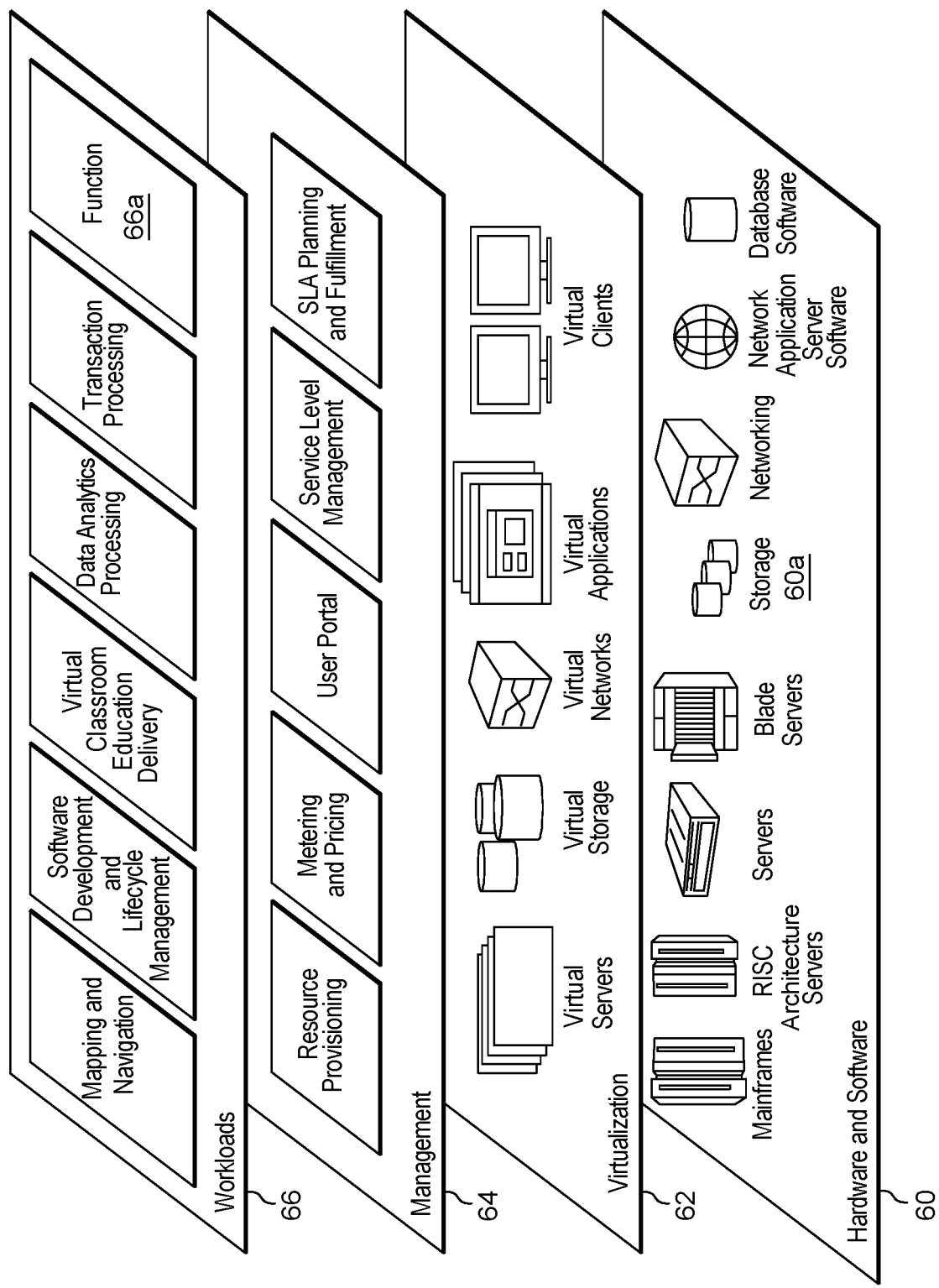
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Program 300 operates to localize private service instances of a global service according to a localization determination based on various inputs such as user identity, user role in associated corporate entity, patterns of service usage, history of service usage, predicted environmental conditions, and subscription data. The localized service instance is generated on an ad hoc basis to avoid the overhead costs for deploying and administering a permanent private cloud service.

Figure 4:
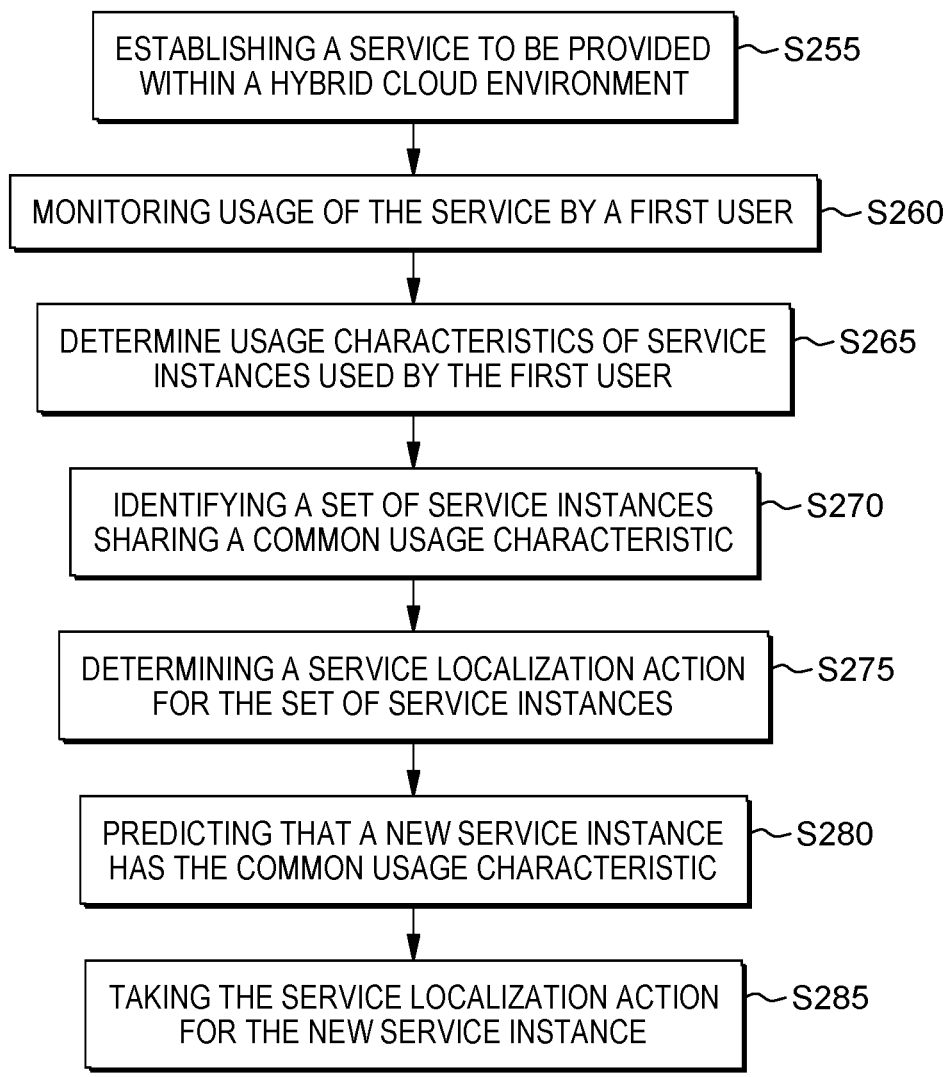
FIG. 4 is a flowchart showing a first embodiment method performed, at least in part, by the first embodiment system.
Figure 5:
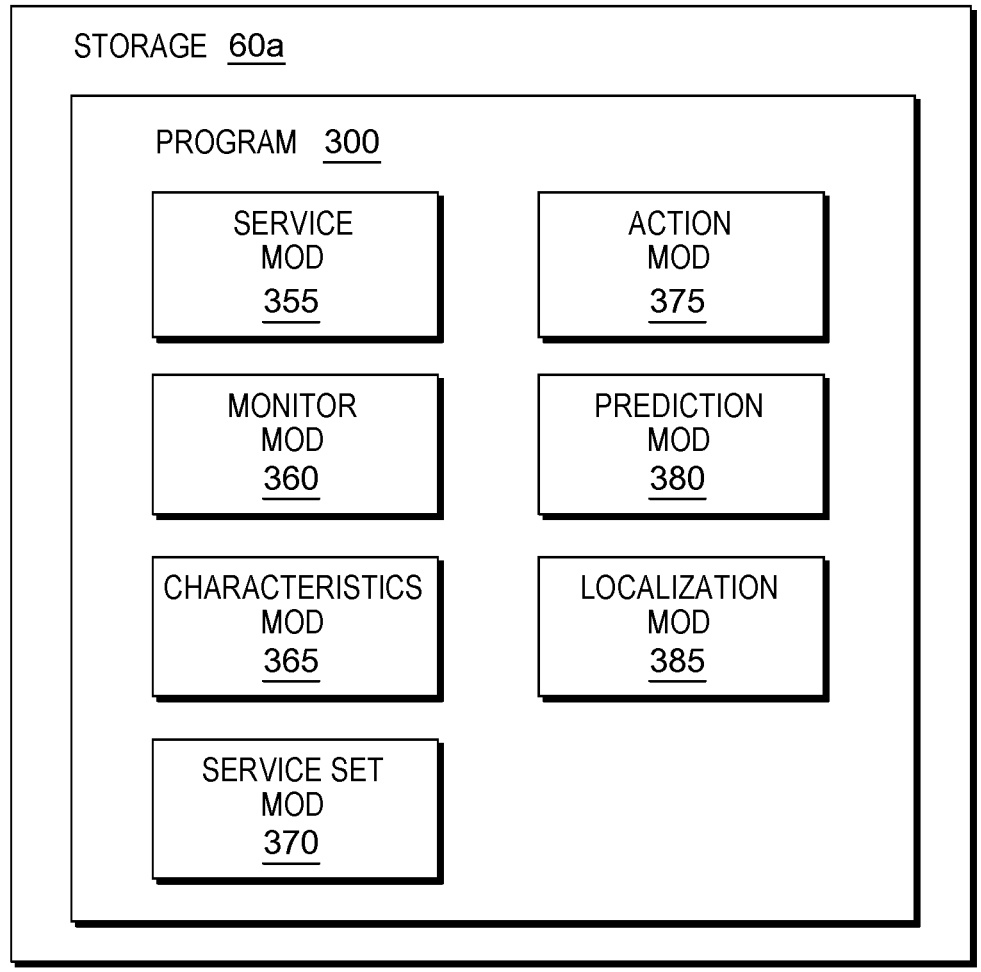
FIG. 5 is a block diagram showing a machine logic (for example, software) portion of the first embodiment system.

FIG. 4 shows flowchart 250 depicting a method according to the present invention. FIG. 5 shows program 300 for performing at least some of the method operations of flowchart 250. This method and associated software will now be discussed, over the course of the following paragraphs, with extensive reference to FIG. 4 (for the method operation blocks) and FIG. 5 (for the software blocks). One physical location where program 300 of FIG. 5 may be stored is in storage block 60*a* (see FIG. 3).

Processing begins at step S255, where service module ("mod") 355 establishes a service to be provided within a hybrid cloud environment. The service mod may establish one of many available services according to a service-oriented architecture. In this example, a single service is established, but in practice many services are likely established over time, so the example merely tracks one service for illustration purposes.

The term "service" as used herein may refer to one of the following: (i) enterprise multiplexer in audio/video conferencing; (ii) enterprise electronic mail (local mail routing) and chat messaging (messaging component); and (iii) enterprise social allowing creation of blogs, wiki, communities, forums, file sharing, and social networking. Alternatively, other services available via a cloud-based service arrangement may be established by the service mod. As noted herein, organizations using a hybrid cloud infrastructure often maintain a substantial part of their cloud-based software deployment in the public cloud component of the hybrid cloud infrastructure. Further, shared information must be synchronized across the public cloud and private cloud portions.

Processing proceeds to step S260, where monitor mod 360 monitors usage of the service by a first user. The monitor mod identifies the service established by service mod 355. In this example, the service mod causes the monitor mod to begin the monitoring process such that the first user is identified. Alternatively, use of the service by the first user triggers a monitoring process by the monitor mod. Alternatively, the first user, upon use of the service, causes the monitor mod to begin monitoring use of the service by the first user. Monitor mod 360 obtains certain usage information regarding the use of the service. The usage information may include: (i) identity of the first user; (ii) enterprise role of the first user; (iii) content of messaging activity; (iv) usage statistics of the first user, such as frequency of use, number of service instances used over a period of time, and length of time each service instance is used; and (v) subscription record of the first user. This example addresses a single service established by the service mod. In practice, it will be likely that multiple services are established and multiple monitoring processes will be performed for a given user or given user role within an organization.

Processing proceeds to step S265, where characteristics mod 365 determines usage characteristics of service instances used by the first user. The characteristics mod operates to determine from the usage information a set of usage characteristics of the service and the first user. Usage information, such as content of messaging activity, service usage statistics, identity and role of the first user, and environmental conditions, is analyzed to determine a context characteristic of the usage of service instances. Further, analysis of usage information such as usage statistics and identity and role of the first user supports determination of a pattern of usage for the first user. If combined with other usage characteristics for similar roles, pattern-based predictions may be generated with respect to an enterprise role.

Processing proceeds to step S270, where service set mod 370 identifies a set of service instances sharing a common usage characteristic. The service set mod works with usage characteristics determined by characteristics mod 365. The preceding example discussion focuses on a first user and a single service where multiple service instances are initiated by the first user. In such a case, service set mod 370 identifies within the multiple service instances a set of service instances having a common usage characteristic, or a common set of usage characteristics. In practice, multiple users may use a particular service so multiple service instances considered by the service set mod may include multiple users. The resulting set of service instances may include enterprise role as one of the common usage characteristics.

Processing proceeds to step S275, where action mod 375 determines a service localization action for the set of service instances having common usage characteristics. By identifying the set of service instances at step 270, a localization action can be associated with the common usage characteristics for the first user. In that way, the common usage characteristics of the service instances initiated by the first user are aligned with the identified localization action. In this example, the service localization action is to create an ad hoc localization of the service from the public cloud by in-memory based provisioning. Alternatively, the service localization action is to create an ad hoc localization of the service from the public cloud by container image-based provisioning. Alternatively, the service localization action is not to create an ad hoc service localization. In practice, multiple users will use a particular service so multiple service instances considered by service set mod 370 may include multiple users. Accordingly, the service localization action may be associated with a set of service instances having a common usage characteristic that is common to more than one user. In this example, a lookup table is generated that associates a set of common usage characteristics with a single service localization action. The table may include several unique sets of usage characteristics that are associated with various service localization actions.

Processing proceeds to step S280, where prediction mod 380 predicts that a new service instance has the common usage characteristic. The prediction module operates to draw from the association of a set of common usage characteristics and a corresponding service localization action by identifying a new service instance of a particular service. The identified new service instance is evaluated for potentially matching usage characteristics. In this example, the prediction module identifies a new service instance initiated by the first user. Based on a same-user approach, the prediction module identifies service localization actions associated with the particular service and the first user.

Alternatively, the prediction module operates on a role-specific basis to identify localization actions for the given service associated with the role of the user. Alternatively, the prediction module identifies the new service and identifies any sets of common usage characteristics associated with the service. When a pre-determined percentage of common usage characteristics are identified, the prediction module determines a predicted set of common usage characteristics. A common usage characteristic may be, for example, an enterprise role so that the use of a service by someone having the same enterprise role may be predicted to exhibit other common usage characteristics Processing end at step S285, where localization mod 385 take the service localization action for the new service instance. The localization mod applies the predicted set of common usage characteristics from step S280 to an assigned service localization action. In this example, localization mod 385 cross-references the predicted common usage characteristics in the lookup table to identify a corresponding service localization action. The identified localization action may be taken even if a user is a first-time user so long as the predicted common usage characteristics match up to the set of usage characteristics in the lookup table. Alternatively, a set of common usage characteristics may only be the enterprise role and the prediction in step 385 is based on the one usage characteristic. In that way, anytime a user matching the enterprise role initiates a new service instance of a particular service, a corresponding localization action is taken by the localization module.

III. Further Comments and/or Embodiments

Figure 6:
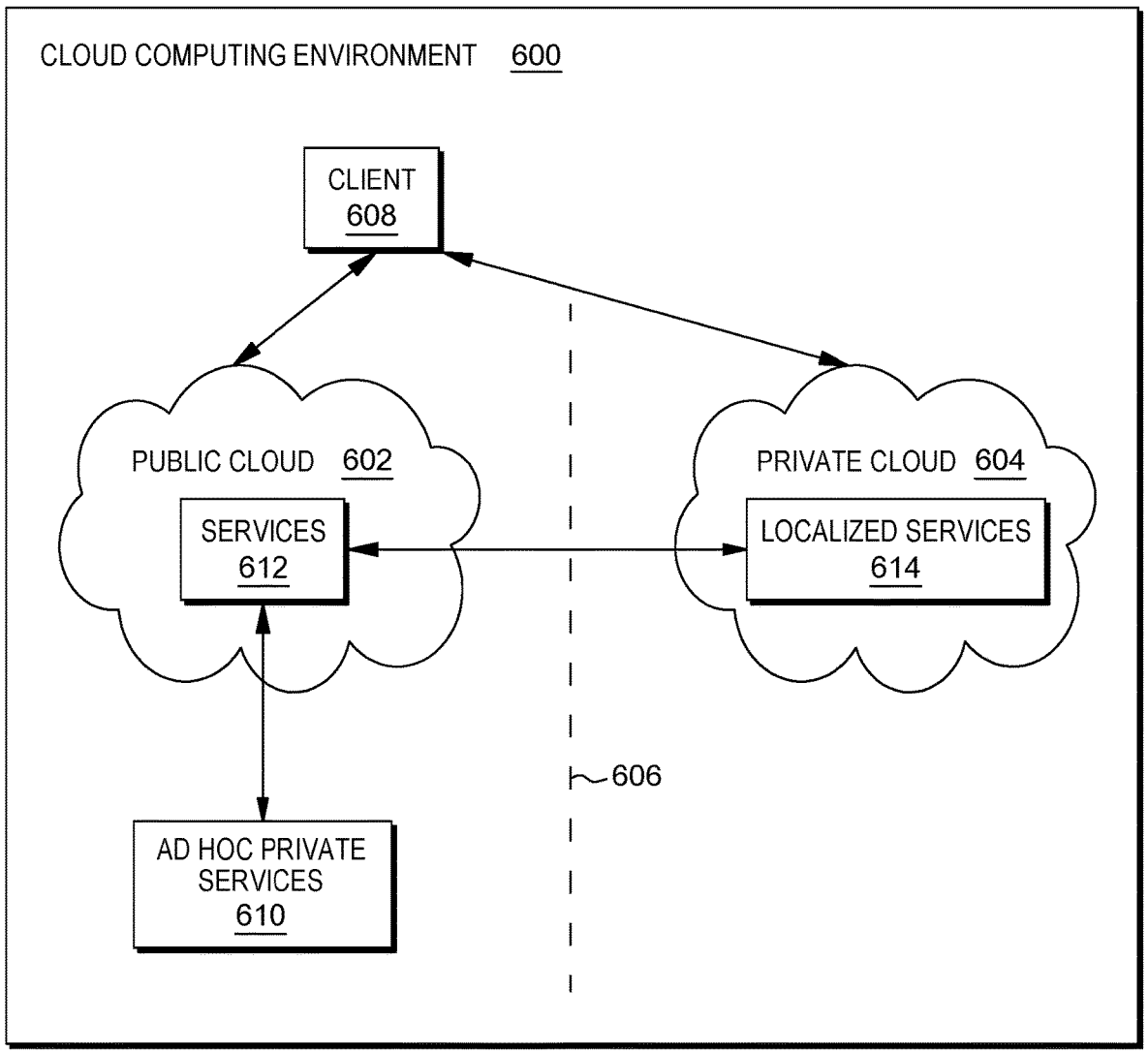
FIG. 6 is a block diagram of a second embodiment of a system according to the present invention.

Some embodiments of the present invention are directed to a software architecture, such as shown in FIG. 6, where a public cloud pushes ad hoc in-memory service instances to locally configured infrastructure of a private cloud portion of a hybrid cloud environment. In that way, the software architecture provides the advantages of hybrid cloud to the user while reducing, or eliminating, the overhead of the user for deploying and administering private cloud service instances in an ongoing basis within the private cloud.

FIG. 6 shows an embodiment of cloud computing environment 600. As shown, cloud computing environment 600 includes a hybrid cloud infrastructure with public cloud portion 602 and private cloud portion 604 and firewall component 606 providing security between public cloud 602 and private cloud 604. Client device 608 has access to both cloud portions 602, 604 of the hybrid cloud infrastructure. Cloud computing environment 600 further includes ad hoc private component 610, which is discussed in detail herein as to how, why, and when ad hoc private component 610 is established.

Some embodiments of the present invention are directed to cloud architecture that creates ad hoc localized private cloud service instances through in-memory image-based provisioning from the public cloud of a hybrid cloud environment. In-memory image-based provisioning refers to on-demand provisioning of an image at the current service state including objects, memory, and run-time. Alternatively, the ad hoc localized private cloud service instance is created through container image-based provisioning from the public cloud. The term container image refers to an image available on cache-vault that can be provisioned. The service portion, which may be referred to as a service instance, micro service, or, simply, service, can serve the users locally is selected for ad hoc localization in the private network portion of the hybrid cloud environment.

Some embodiments of the present invention are directed to one or more of the following service instances: (i) for Enterprise Multiplexer in Audio Video Conferencing Service; (ii) Enterprise Email (Local mail Routers); (iii) Chat Message (Messaging Component); and (iv) Enterprise Social data services. It should be noted that enterprise social data services are the types of services that support creation of information available on the internet such as blogs, wikis, user communities, user forums, file sharing services, and social networking.

Some embodiments of the present invention are directed to establishing localized services within a private network that maintains enterprise wide collaboration data and social data securely within the private network boundary for compliance with security, privacy, and governance requirements of an organization.

Some embodiments of the present invention are directed to allowing users to have highly secure communications and collaborations that do not cross private network boundary within the hybrid cloud environment. That is, the public cloud component of the hybrid cloud environment creates a private localized service instance for secure communications.

Some embodiments of the present invention are directed to organizations having stringent security and privacy requirements that compel the organization to disallow network-based communications within the organization and artifacts creation/sharing among users within the organization, to avoid crossing the private network boundary into the public network of a hybrid cloud environment.

Some embodiments of the present invention are directed to supporting organizations that want high performance and high availability characteristics from their network regardless of service disruptions and planned maintenance outages on the public cloud portion of their hybrid cloud environment.

Some embodiments of the present invention are directed to collaboration (e.g. audio-visual conferences, email correspondence, and online chat sessions) among users within an organization and with trusted third parties external to the organization.

Some embodiments of the present invention are directed to creation and sharing of artifacts within an organization over the network using blogs, wikis, user communities, user forums, and file sharing services even if those services require the exchange of data to remain within the private network boundary of a hybrid cloud environment. This is accomplished by the ad hoc creation of a private service instance provisioned from the public cloud based on a stored service image including objects, memory, and run-time.

Figure 7:
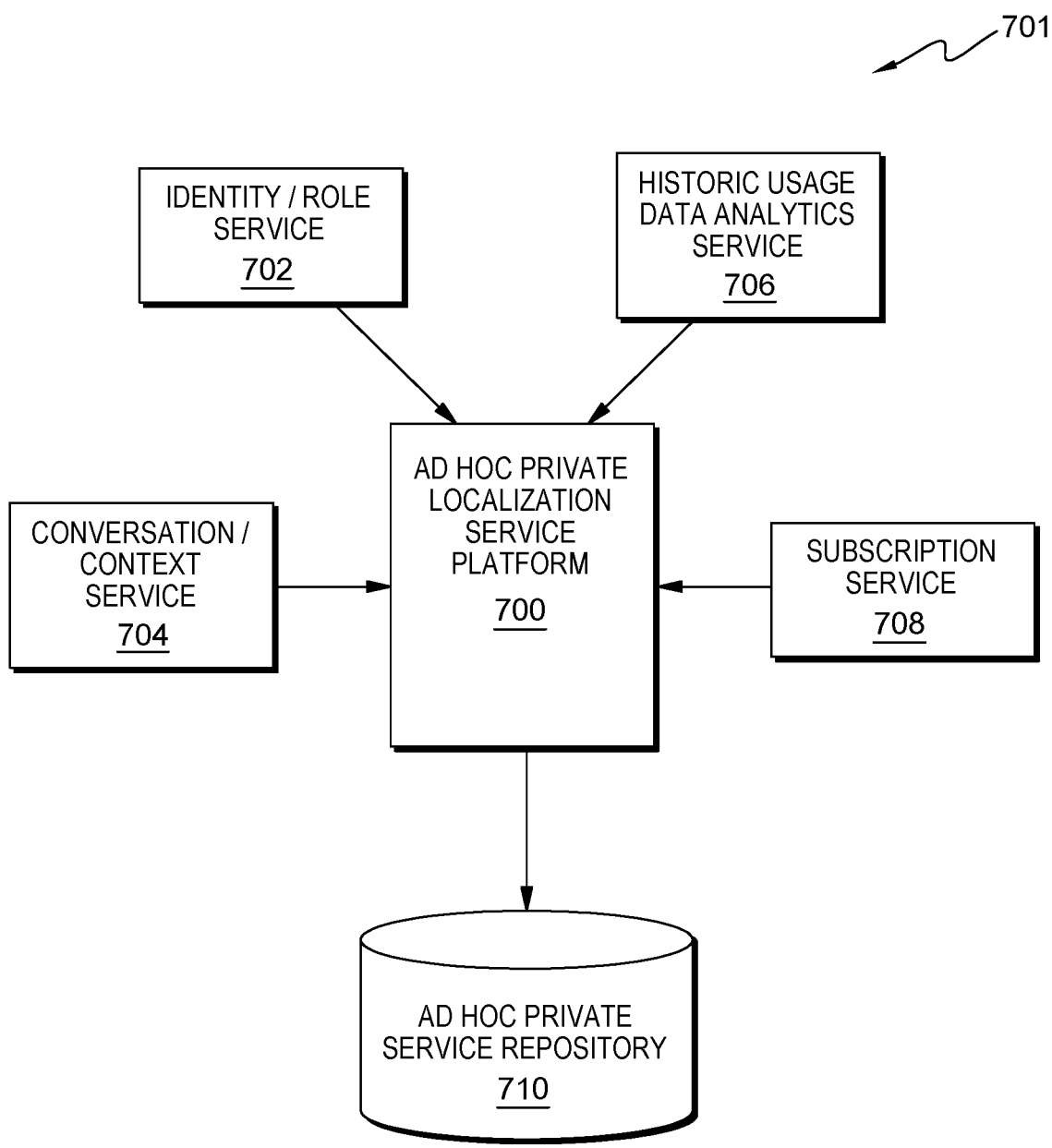
FIG. 7 is a block diagram of a third embodiment of a system according to the present invention.

FIG. 7 illustrates services system 701 in which ad hoc private services are generated and/or stored for on-demand use. Ad hoc private localization service platform 700 receives inputs from various service instances including, as-illustrated, identity/role management service 702, conversation/context service 704, historic data usage analytics service 706, and subscription information service 708. The ad-hoc private localization service platform operates to generate ad hoc private services stored in ad hoc private services repository 710 for in-memory image-based provisioning. Alternatively, ad hoc private services are provisioned via a cache vault for container image-based provisioning, illustrated in FIG. 8.

The ad hoc service platform shown in FIG. 7 draws from role-based input, context input, pattern prediction available through data usage analysis, and subscription service input to determine when to establish an ad hoc localization of a particular service. Alternatively, fewer inputs influence the establishment of ad hoc localization of a service. Alternatively, a mix of the discloses inputs and additional inputs influence the establishment of ad hoc localization of a service.

Some embodiments of the present invention are directed to context-based private localization of service instances by a public cloud service in a hybrid cloud environment. For example, a customer has a conference call scheduled where the two-hour call will involve the exchange of highly confidential data. In this example, the customer requires that the highly confidential data not cross organization boundaries from the private cloud to the public cloud. Accordingly, the customer requires the service instance of the conference call to run thru a localized service instance. The localized service instance is achieved according to some embodiments of the present invention by performing certain steps discussed below. Identifying the required micro services, or service instances, for providing the required functionality based on a meeting context determined by analysis of the meeting request and invited participants. The required service instances are collated and pushed to a corresponding system hub of the private cloud. In this example, the system hub is the memory controller unit (MCU). After selected micro-services are localized, other required service instances are registered to the public cloud service. That is, the public cloud service is divided into a set of micro-services. Certain of the micro-services are handled by a private cloud system hub, while the remaining micro-services and handled normally, as a public cloud micro-service. At the time of call initiation to the public cloud service, the cloud service module determines if there is a private localized service instance registered for the call. Upon identifying the registered entry, the cloud service module negotiates the private localized service details instead of negotiating the details of the public cloud service instance. After negotiation is complete, the conference call will be accomplished via the corresponding system hub, in this example, the MCU operates to maintain conference call data within the private cloud boundary.

Some embodiments of the present invention are directed to pattern-based private localization of service instances by a public cloud service in a hybrid cloud environment. For example, a user organization establishes conference calls that are scheduled every Thursday with a minimum of 50 participants from various geographic locations. Participant experience is improved by private cloud localization of a conference call service instance where service performance is improved. Pattern-based analysis of practices of the user organization system provides insight into learned patterns of the user organization. Insight is gained regarding frequency and duration of meetings based on historic conference call records. Further, analysis of prior usage provides helpful system and network capability patterns. Based on these learned patterns, some embodiments of the present invention identify when circumstances will be good for service localization to the private cloud. Alternatively, some embodiments of the present invention predict when circumstances will be good for service localization to the private cloud by drawing conclusion from pattern-based data. When appropriate, the conference call service instance, or micro-service, will be pushed from the public cloud portion of the hybrid cloud to the private cloud portion. In that way, a lifetime of localized service instances may be derived from learned patterns of the user organization.

Some embodiments of the present invention are directed to subscription-based private localization of service instances. When applying aspects of the present invention to subscription-based private localization, a determination is made at the time of subscription of a given user. When a particular user subscribes to a service, certain associated micro-services are identified from within the service that are available for private localization. Alternatively, certain pre-defined micro-services of the service are determined to be required to be localized in the private cloud portion of the hybrid cloud environment. That is, certain micro-services may be required by the user at the time of subscription to be localized in the user's private infrastructure.

Some embodiments of the present invention are directed to prediction-based private localization of service instances. The term prediction-based refers to external predictions, such as weather forecasting alerts that are deemed to impact a particular service provided via the hybrid cloud environment. For example, a localized service instance in the private network may be required to be withdrawn back to the public network due to predicted local weather events. Some embodiments of the present invention gradually dispose of the localized private service instance in favor of a global service instance that is not impacted by a predicted local weather event.

In summary, localized service instances are derived for a service lifetime by employing context, patterns, subscriptions, and predictions associated with the specific use of the service. For example: (i) context may arise when a localized service instance is terminated based on intrusion or threat detection on the localized system; (ii) patterns may support learned localization actions where a localized service instance will be gradually disposed of according to a pattern of usage of the localized service instance; (iii) subscriptions drive private localization where a localized service instance is disposed of based on subscription parameters that are pre-defined according to user input at the time of subscribing to the service; and (iv) predictions influence private localization in that weather forecasts may support a determination of a future disruption of localized micro-services that may lead to a forced shutdown such that the localized micro-services may be required to be disposed of gradually and a global service instance may be required to avoid the force shutdown.

Some embodiments of the present invention are directed to a memory vault for caching localized service instance images. In some embodiments, the localized service instance images are composed automatically and cached in the memory vault, which may also be referred to as a common container vault, for later use. In that way, private localization is streamlined and made available more quickly by reference to the stored localized service instance images. Alternatively, the localized service instance images are composed manually and cached in the memory vault.

Figure 8:
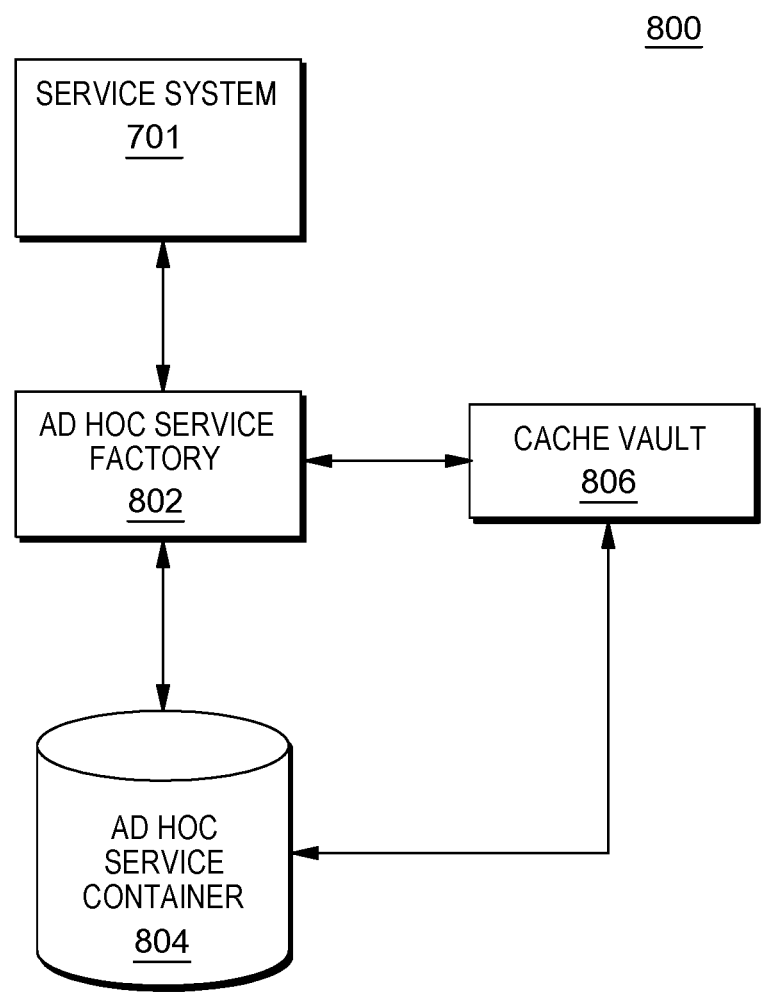
FIG. 8 is a block diagram of a fourth embodiment of a system according to the present invention.

FIG. 8 illustrates ad hoc service providing system 800. Services system 701 (FIG. 7) is a source of services for ad hoc service factory 802. The service factory operates to deliver specified services to ad hoc service container 804. Container images stored in the ad hoc service container are made available in cache vault 806 for container image-based provisioning from a public cloud, such a public cloud component 602 (FIG. 6). Some embodiments of the present invention employ cache vault 806 for provisioning most frequently used services. When a service requested by service system 701 is not available in cache vault 806, ad hoc service factory 802 creates an ad hoc service container, such as container 804, from available modules or from in-memory service instances.

Some embodiments of the present invention are directed to enhancing and ad hoc creation of newer offerings based on applied machine learning and usage patterns of the localized service instance. In some embodiments, the localized service instance images are composed automatically and cached in the memory vault, which may also be referred to as a common container vault, for later use. In that way, private localization is streamlined and made available more quickly by reference to the stored localized service instance images. Alternatively, the localized service instance images are composed manually and cached in the memory vault.

Some embodiments of the present invention are directed to a method and system of providing a cloud architecture for creating localized private service instances through in-memory/container image-based provisioning from the public cloud, wherein a part (micro service) of the overall cloud service that can serve the users locally will be chosen for localization. Aspects of the present invention include: providing ad hoc private localization of service instance in cloud environment based on context, pattern, subscription or predictions; deriving lifetime of localized service instance using context, pattern, subscription or predictions; automatically/manually composing localized instance images and caching in a common container vault for future use; and using applied machine learning and usage patterns of the localized service instance for enhancing and ad hoc creation of newer offerings.

Some embodiments of the present invention are directed to providing delegation of responsibility from the public cloud portion to the private cloud portion of the hybrid cloud. The delegation of responsibility is dependent upon defining delegation by rules and/or configurations to support decision-making that may push localized service instances to customer primes or private cloud portions.

Figure 9:
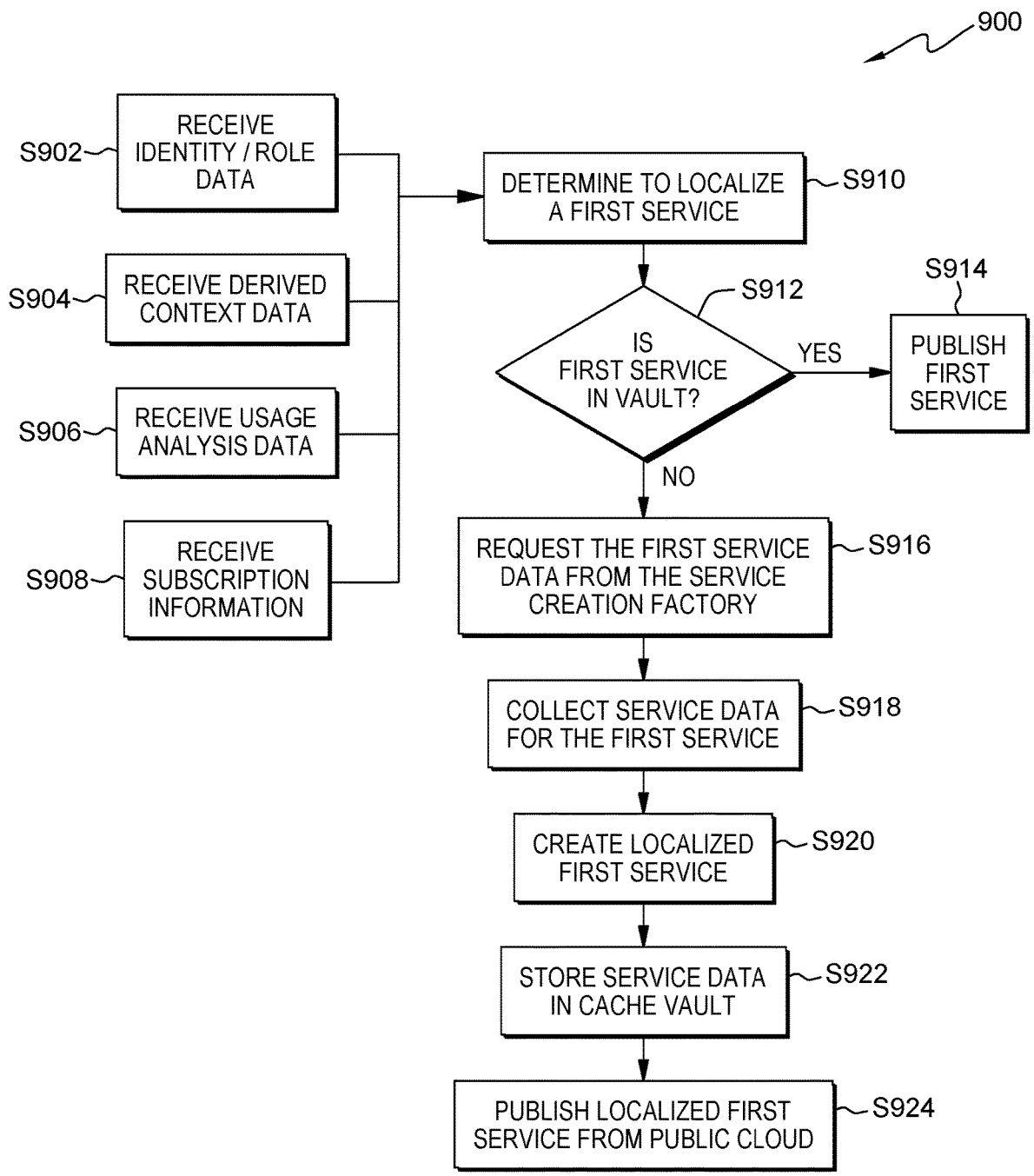
FIG. 9 is a flow chart of a second embodiment method performed, at least in part, by the second and third embodiment systems.
Figure 10:
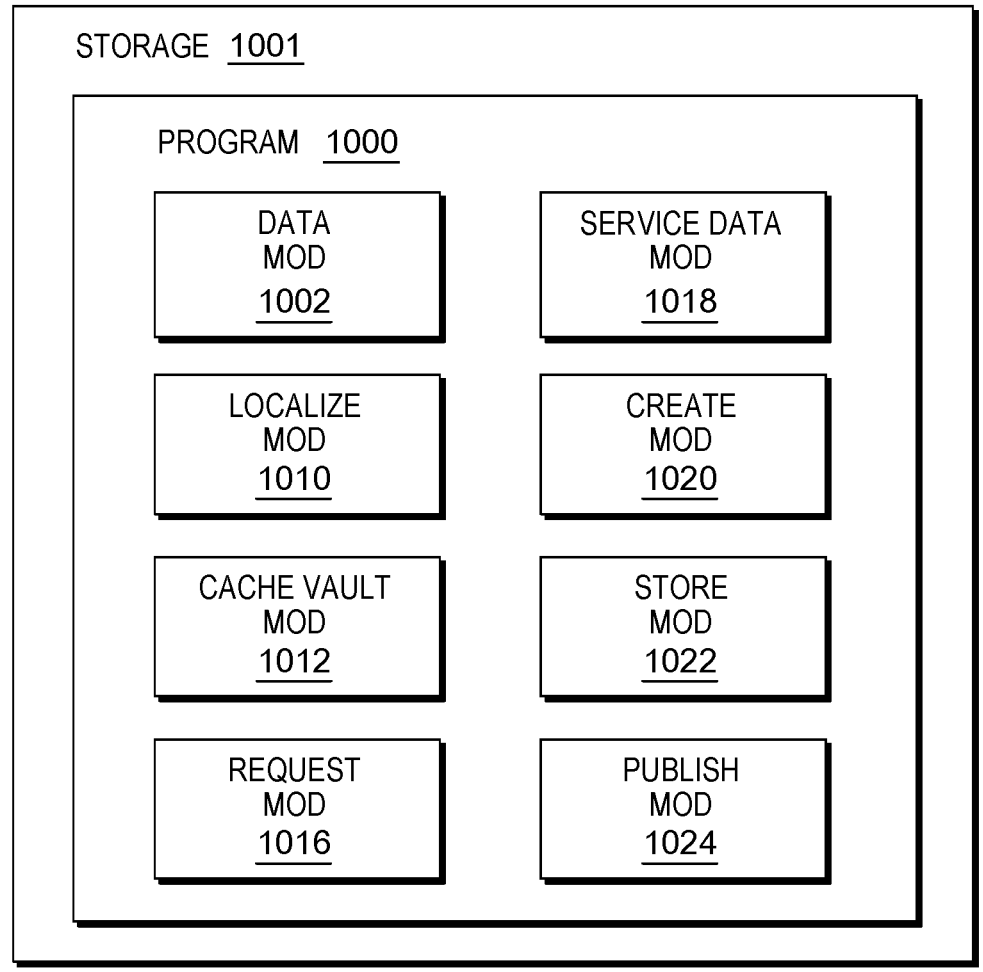
FIG. 10 is a block diagram showing a machine logic (for example, software) portion of the second, third, and fourth embodiment systems.

FIG. 9 shows flowchart 900 depicting a method according to the present invention. FIG. 10 shows program 1000 for performing as least some of the method operations of flowchart 900. This method and associated software will now be discussed, over the course of the following paragraphs, with reference to FIG. 9 (for the method operation blocks) and FIG. 10 (for the software blocks). One physical location where program 1000 of FIG. 10 may be stored is in storage block 1001, as part of cloud computing environment 600.

The steps S902 through S908 that follow are illustrated as parallel operations leading to processing steps that operate to localize certain services via ad hoc localization of a private service from a public cloud. Each of the steps S902 to S908 do not have to be performed, that is any one of the steps may be performed or any number of steps may be performed according to implementation preferences of the user or according to governing policy of, for example, the owning entity of the hybrid cloud environment.

Processing begins at step S902 where data module ("mod") 1002 receives data corresponding to the identity and/or role of the user. In this example, the user is in communication with hybrid cloud computing environment 600 (FIG. 6) via client sub-system 608, which is a laptop computer for purposes of this discussion. The user enters credentials to access the cloud computing environment. These credentials are linked to the user identity and role played within the organization owning private cloud component 604. Alternatively, the client device is linked to a particular role of any user operating the client device. Alternatively, only the user identity is received by data mod 1002. Regardless of how user information is obtained via interaction with the hybrid cloud environment, the data module receives user identity and/or role data.

Processing proceeds to step S904 where data mod 1002 receives derived context data associated with communications content generated by the user. Content generated during by the user is received by the data mod. The derived context data is generated by tools known in the art for processing communications content. In this example, the user generated content while using client sub-system 608, including email messages and chat sessions. Alternatively, content is generated by audio produced during a telephone conference. Alternatively, content is generated by a calendar application accessed by the user over a hybrid cloud environment where, for example, a meeting request is generated with certain invited participants. Context data is derived from the generated content. Context data includes, for example, usage characteristics, topics of discussion, and termination of a service instance based on intrusion or threat detection.

Processing proceeds to step S906 where data mod 1002 receives service usage analysis data. Analysis data, as used herein, refers to insights derived from service usage over time based on historic records of usage. In this example, service usage is monitored and reported during cloud access periods by the user. Service usage includes information regarding access to private cloud an/or public cloud portions of a hybrid cloud; and usage of data only accessible via a private cloud. Analysis of service usage provides insight into patterns of service usage; and usage statistics of a given user, such as frequency of use, number of service instances used over a period of time, and length of time each service instance is used.

Processing proceeds to step S908 where data mod 1002 receives subscription information. In this example, subscription information refers to subscriptions associated with the identified user. Alternatively, subscriptions associated with a device used to access the hybrid cloud environment is received. Alternatively, subscriptions associated with a particular role of a user make up the subscription information. For example, when a particular user subscribes to a service, certain associated micro-services are identified from within the service that are available for private localization. That is, some micro-services may be required by the user at the time of subscription to be localized in the user's private infrastructure. According to some embodiments of the present invention subscriptions drive private localization where a localized service instance is disposed of based on subscription parameters that are pre-defined according to user input at the time of subscribing to the service.

Processing proceeds to step S910 where localize mod 1010 determines to localize a first service. The determination to localize the service relies at least in part on the data received in one or more of steps S902 to S908. In this example, service localization determination is made based on user identity, context, patterns of usage, and subscriptions. Alternatively, determination to localize a service is based on only one of the listed bases. Patterns of usage may also be referred to as predicted needs of the user where a historic pattern of service usage along with, perhaps, a particular context supports a predictive determination to localize a particular set of services. Alternatively, for a particular role a pre-determined localization action applies to one or more services.

Processing proceeds to decision step S912 where vault mod 1012 searches the cache vault for an existing service matching the first service to be localized according to localize mod 1010. If the first service matches an existing service stored in the cache vault, processing follows the "yes" branch to step S914 where the first service is published using the existing service. If the first service does not match an existing service within the cache vault, processing follows the "no" branch to step S916.

When processing follows the no branch, processing proceeds to step S916, where request mod 1016 requests the service data corresponding to the first service from a service creation factory. In this example, the request mod requests the service data from ad hoc service factory 802 (FIG. 8). As noted earlier, the service factory operates to deliver specified services from ad hoc service container 804. In this example, service data is prepared by the service factory for use in generating a localized service.

Processing proceeds to step S918 where collection mod 1018 collects the service data received by the request mod. In this example, the service creation factory generates the requested service data and the collection mod collects the generated service data. Further, collection mod 1018 organizes and/or indexes the service data for localization operations.

Processing proceeds to step S920 where localize mod 1020 creates a localized first service. In this example, the localize mod creates the first service according to the collected service data for the first service.

Processing proceeds to step S922 where storage mod 1022 stores the localized first service data. In this example, the storage mod stores the localized first service data in a cache vault, such as cache vault 806 (FIG. 8). Alternatively, the collected data is stored for future use when a similar localized service is to be generated, so the data is reused for generating the localized service.

Processing ends at step S924 where publish mod 1024 publishes the localized first service from a public cloud portion of a hybrid cloud.

Some embodiments of the present invention may include one, or more, of the following features, characteristics and/or advantages: (i) benefits of the public cloud, such as relative cost effectiveness, delegation of responsibility to third parties, on-demand upward scaling, on-demand downward scaling, and on-demand service provisioning, may be more fully realized when practicing aspects of the present invention; (ii) in a hybrid cloud environment, data that should not cross boundaries between the public and the private network due to stringent security and compliance requirements may be contained within the private network; (iii) dedicated public and private service instances are deployed for users to achieve performance, security, and privacy according to the requirements of the user; (iv) software architecture provides the advantages of hybrid cloud deployment while reducing, or eliminating, the overhead of the user for deploying and administering private cloud service instances; (v) a cloud architecture that dynamically adapts to changing topological and geographical uncertainties; (vi) a cloud architecture that dynamically provides business continuity; (vii) secured collaboration within a hybrid cloud environment; (viii) provides for service availability to users within the organization via the private cloud portion of the hybrid cloud where delegation of responsibility is defined; (ix) preservation of internet bandwidth where users are located on the same local area network; and (x) high response time is supported by local execution of services, thus enhancing the overall service experience of the user.

Some embodiments of the present invention may include one, or more, of the following features, characteristics and/or advantages: (i) ad hoc private localization of service instance in hybrid cloud environment based on context, pattern, subscription, and/or predictions; (ii) lifetime of localized service instances derived from context, pattern, subscription, and/or predictions; (iii) storage for caching localized service instance images; and (iv) ad hoc creation of localized service instances for newly available offerings based on applied machine learning and usage patterns of previously localized service instances.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v)

located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method for ad hoc private service localization from a public cloud component in a hybrid cloud environment, the method comprising:
    monitoring a global service for usage characteristics as various service instances are used by a set of users, the usage characteristics including user identities, enterprise roles of users, content of messaging activity, and length of use of service instances;
    identifying, based on the usage characteristics, a set of service instances of the global service within the hybrid cloud environment, the set of service instances each associated with a first usage pattern, the first usage pattern including an enterprise role assigned to users-of the set of service instances and content of messaging activity of the users, the enterprise role and the content of messaging activity matching for each of the set of service instances, the first usage pattern further including a length of use of a first service instance;
    composing a set of private service instance images of the set of service instances, including a first private service instance image of the first service instance;
    determining to create an ad hoc private localization of current service instances from the public cloud of the hybrid cloud environment when a current service instance not within the set of service instances exhibits usage characteristics matching the first usage pattern;
    determining, while monitoring the global service set of service instances for usage characteristics, a new service instance exhibits usage characteristics matching the first usage pattern;
    responsive to matching the first usage pattern to use of the new service instance, publishing a first ad hoc localization of the new service instance by establishing an ad hoc private service instance from the public cloud component by localizing the first private service instance image of the set of private service instance images.

2. The computer-implemented method of claim 1, further comprising:
    identifying within the usage characteristics at least one of usage context, subscription-based input from the set of users, and predicted environmental conditions.

3. The computer-implemented method of claim 1, further comprising:
    collecting the usage characteristics as a set of usage data;
    providing the set of usage data to an analysis engine to generate usage context data; and
    creating the ad hoc localization of the global service from the public cloud is further responsive to the usage context matching a context of usage of the first service instance.

4. The computer-implemented method of claim 1, further comprising:
    collecting the usage characteristics as a set of usage data;
    providing the set of usage data to an analysis engine to generate usage pattern data; and
    the first usage pattern is based on the usage pattern data.

5. The computer-implemented method of claim 1, further comprising:
    storing the set of private service instance images in a container vault including the first private service instance; and
    provisioning from the public cloud the first private service instance of the first service instance on-demand from the container vault.

6. The computer-implemented method of claim 1, further comprising:
    generating an in-memory image of the private service instance image for provisioning of the in-memory image at a current service state including objects, memory, and run-time.

7. A computer program product comprising a computer-readable storage medium having a set of instructions stored therein which, when executed by a processor, causes the processor to establish an ad hoc private service localization from a public cloud component in a hybrid cloud environment by:
    monitoring a global service for usage characteristics as various service instances are used by a set of users, the usage characteristics including user identities, enterprise roles of users, content of messaging activity, and length of use of service instances;
    identifying, based on the usage characteristics, a set of service instances of the global service within the hybrid cloud environment, the set of service instances each associated with a first usage pattern, the first usage pattern including an enterprise role assigned to users-of the set of service instances and content of messaging activity of the users, the enterprise role and the content of messaging activity matching for each of the set of service instances, the first usage pattern further including a length of use of a first service instance;
    composing a set of private service instance images of the set of service instances, including a first private service instance image of the first service instance;
    determining to create an ad hoc private localization of current service instances from the public cloud of the hybrid cloud environment when a current service instance not within the set of service instances exhibits usage characteristics matching the first usage pattern;
    determining, while monitoring the global service set of service instances for usage characteristics, a new service instance exhibits usage characteristics matching the first usage pattern;
    responsive to matching the first usage pattern to use of the new service instance, publishing a first ad hoc localization of the new service instance by establishing an ad hoc private service instance from the public cloud component by localizing the first private service instance image of the set of private service instance images.

8. The computer program product of claim 7, further comprising:
    identifying within the usage characteristics at least one of usage context, subscription-based input from the set of users, and predicted environmental conditions.

9. The computer program product of claim 7, further causing the processor to establish an ad hoc private service localization from a public cloud component in a hybrid cloud environment by:
    collecting the usage characteristics as a set of usage data;

providing the set of usage data to an analysis engine to generate usage context data; and creating the ad hoc localization of the global service from the public cloud is further responsive to the usage context matching a context of usage of the first service instance.

10. The computer program product of claim 7, further causing the processor to establish an ad hoc private service localization from a public cloud component in a hybrid cloud environment by:

collecting the usage characteristics as a set of usage data;

providing the set of usage data to an analysis engine to generate usage pattern data; and the first usage pattern is based on the usage pattern data.

11. The computer program product of claim 7, further causing the processor to establish an ad hoc private service localization from a public cloud component in a hybrid cloud environment by:

storing the set of private service instance images in a container vault including the first private service instance; and provisioning from the public cloud the first private service instance of the first service instance on-demand from the container vault.

12. A computer system for ad hoc private service localization from a public cloud component in a hybrid cloud environment, the computer system comprising:

a processor set; and a computer readable storage medium having program instructions stored therein;

wherein:

the processor set executes the program instructions that cause the processor set to establish an ad hoc private service localization from a public cloud component in a hybrid cloud environment by:

monitoring a global service for usage characteristics as various service instances are used by a set of users, the usage characteristics including user identities, enterprise roles of users, content of messaging activity, and length of use of service instances;

identifying, based on the usage characteristics, a set of service instances of the global service within the hybrid cloud environment, the set of service instances each associated with a first usage pattern, the first usage pattern including an enterprise role assigned to users-of the set of service instances and content of messaging activity of the users, the enterprise role and the content of messaging activity matching for each of the set of service instances, the first usage pattern further including a length of use of a first service instance;

composing a set of private service instance images of the set of service instances, including a first private service instance image of the first service instance;

determining to create an ad hoc private localization of current service instances from the public cloud of the hybrid cloud environment when a current service instance not within the set of service instances exhibits usage characteristics matching the first usage pattern;

determining, while monitoring the global service set of service instances for usage characteristics, a new service instance exhibits usage characteristics matching the first usage pattern;

responsive to matching the first usage pattern to use of the new service instance, publishing a first ad hoc localization of the new service instance by establishing an ad hoc private service instance from the public cloud component by localizing the first private service instance image of the set of private service instance images.

13. The computer system of claim 12, further comprising:
identifying within the usage data at least one of usage context, subscription-based input from the set of users, and predicted environmental conditions.

14. The computer system of claim 12, further comprising:
collecting the usage characteristics as a set of usage data;
providing the a set of usage data to an analysis engine to generate usage context data; and
creating the ad hoc localization of the global service from the public cloud is further responsive to the usage context matching a context of usage of the first service instance.

15. The computer system of claim 12, further comprising:
collecting the usage characteristics as a set of usage data;
providing the a set of usage data to an analysis engine to generate usage pattern data; and
the first usage pattern is based on the usage pattern data.

16. The computer system of claim 12, further comprising:
storing the set of private service instance images in a container vault including the first private service instance; and
provisioning from the public cloud the first private service instance of the first service instance on-demand from the container vault.

17. The computer system of claim 12, further comprising:
generating an in-memory image of the private service instance image for provisioning of the in-memory image at a current service state including objects, memory, and run-time.

* * * * *